Nov. 15, 1949  J. D. SPALDING  2,488,069
PUMP DRIVE
Filed Aug. 1, 1944
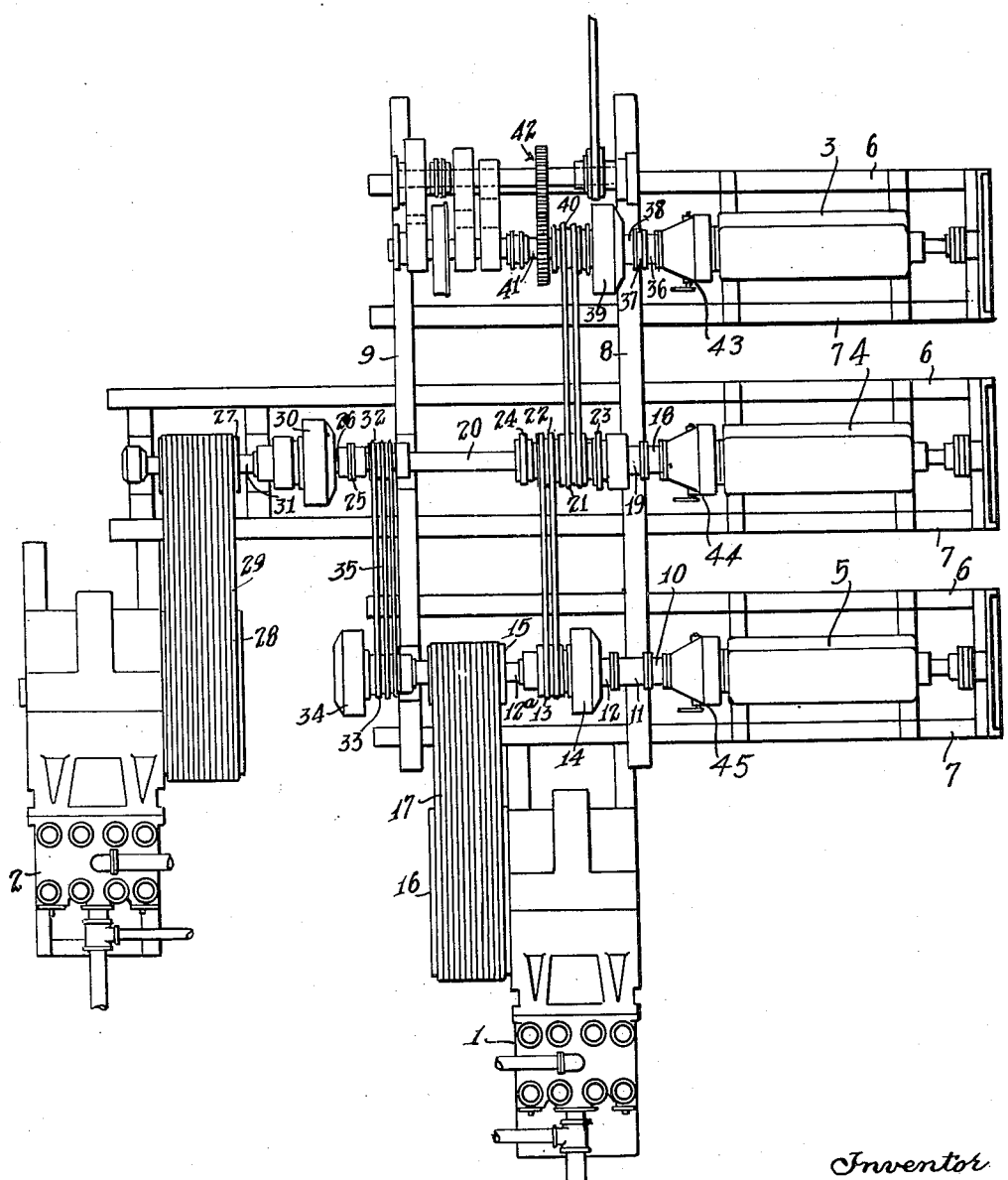
Inventor
John D. Spalding
By Lyon & Lyon
attorneys

UNITED STATES PATENT OFFICE 2,488,069

PUMP DRIVE

John D. Spalding, Los Angeles, Calif., assignor to The National Supply Company, Pittsburgh, Pa., a corporation of Pennsylvania Application August 1, 1944, Serial No. 547,608

6 Claims. (Cl. 103—10)

This invention relates to pump drives and more particularly to the provision of a drive means for a pair of pumps in which there is incorporated a two-speed drive for one of the pumps.

This invention is directed to the pump driving mechanism illustrated in the copending application of Forrest J. Young filed July 29, 1944, for Consolidated rig, Serial No. 547,264.

It is an object of this invention to provide a multiple speed pump drive which is incorporated in a drive mechanism for a pair of pumps and which will permit one of the pumps to be operated to provide a high pressure circulation of drilling mud.

Another object of this invention is to provide a drive mechanism for the pumps of a rotary drilling rig wherein there is employed a plurality of driving engines operably connected through transmission means to the respective pumps and in which transmission there is provided pneumatically operated friction clutches so arranged as to permit direct drive of the respective pumps from their associated engines and also permit a low speed drive to one of the pumps for the maintenance of a high pressure circulation of drilling mud from such pump.

Other objects and advantages of this invention it is believed will be apparent from the following detailed description of a preferred embodiment thereof as illustrated in the accompanying drawing.

The single figure is a top diagrammatic view of the pump drive embodying my invention.

In the preferred embodiment of my invention as illustrated in this drawing, 1 and 2 indicate pumps of the type well known in this art for the circulation of "mud fluid" as utilized in the rotary process of drilling wells.

In the driving mechanism illustrated there are indicated three engines at 3, 4 and 5 which are internal combustion engines preferably of the Diesel type. A transmission means is interposed between the engines 3, 4 and 5 and the pumps 1 and 2 which will permit any one of the three engines to be utilized to drive either of the pumps 1 or 2 and which, if desired, will permit compounding of the engines so that more than one engine may be used to drive more than one pump where desired.

As indicated, the engines 3, 4 and 5 are supported upon longitudinally extending frame members 6 and 7 and each pair of such frame members extends forwardly from their respective engines and are connected to transverse frame members 8 and 9. Each of the engines 3, 4, and 5 is provided with the customary service clutch 43, 44 and 45 for connecting the engine with its power take-off shaft 36, 18 and 10, respectively.

A drive shaft 10 of the engine 5 is coupled by means of an elongated coupling 11 with the drive hub 12 of the friction clutch 14. Journaled upon the drive shaft 12a is a sprocket 13 and this sprocket is adapted to be releasably coupled with the shaft 12a through the medium of the pneumatically operated friction clutch indicated at 14. Carried by the shaft 12a so as to be driven thereby is a V-belt pulley 15 which is aligned with driven V-belt pulley 16 of the pump 1 so that said pulley 16 is driven through the V-belts 17 connecting the pulleys 15 and 16.

The engine 4 has its drive shaft 18 connected through the medium of a coupling 19 with a countershaft 20. Journaled on the countershaft 20 are a pair of independent sprockets 21 and 22 which are adapted to be releasably clutched to the shaft 20 through the medium of jaw clutches diagrammatically illustrated at 23 and 24. The shaft 20 extends outwardly and is coupled by means of a coupling 25 with a pump driving clutch 30. The clutch 30 is mounted on the shaft 31 which carries a pump driving pulley 27 in alignment with the driven pulley 28 of the pump 2. A multiple V-belt transmission element 29 connects the pulleys 27 and 28. The pneumatically operated friction clutch 30 is employed for releasably coupling the shaft 20 with a shaft 31 to which the pulley 27 is secured.

Secured to the shaft 20 is a low speed pump drive sprocket 32 which is in alignment with a driven clutch sprocket 33 of a pneumatically operated friction clutch 34. A multiple chain transmission 35 connects the sprockets 32 and 33. The friction clutch 34 releasably couples the sprockets 33 to the shaft 12a.

The pneumaticaly operated friction clutches 14 and 34 may be of any suitable type or construction and are similar in construction to the friction clutches illustrated in the copending application of Forrest J. Young hereinabove referred to.

In the case of the pneumatic friction clutch 14 the hub 12 is formed as an extension of the clutch housing so that the clutch housing is directly driven from the engine 5 together with the sprocket 13 and the shaft 12a to which the pulley 15 is secured is adapted to be coupled with the rotating housing of the clutch upon actuation of the clutch plates to close the clutch.

It will thus be seen that the engine 5 may be employed for directly operating the mud pump 1. It will also be seen that the driven pulley 15 of the mud pump 1 may be driven at a reduced speed from the engine 5 by driving the sprocket 13 to drive the sprocket 22 and when the clutch 24 is closed to drive the countershaft 20. The driven sprocket 33 of the clutch 34 is then being driven so that when the pneumatic clutch 34 is actuated to couple the sprocket 33 with the shaft 12ª, the driven pulley 15 will be driven at a reduced speed permitting the pump to be operated under high pressure, low volume conditions. The engine 3 has its drive shat 36 connected through a removable coupling 37 (see copending application of Forrest J. Young for Consolidated rig above referred to) with the clutch shaft 38 of the pneumatic friction clutch 39. Carried by the clutch housing to be driven therewith is a sprocket 40. As set forth in the aforesaid copending application of Forrest J. Young, the clutch 39 provides the means for coupling the engine 3 and the sprocket 40 with the driven shaft 41 of a multiple speed and reverse transmission 42 utilized ordinarily for the driving of other units of the consolidated rig.

The clutches 14, 30, 34 and 39 are preferably of the pneumatic friction type. Each of the clutches 14, 34 and 39 includes an outer housing which carries a transmission sprocket so as to rotate with the housing. The clutch spider of each of these clutches is mounted within the housing and friction clutch plates are interposed between the spider and the housing. As briefly set forth, these clutches may be of the type illustrated in the copending application of Forrest J. Young for Consolidated rig, filed July 29, 1944, Serial 547,264. The housings in each case provides the driven element of the clutch assembly so that their corresponding sprockets are driven. For example, in the case of the pneumatic clutch 14 the clutch housing is secured directly to the drive shaft 10 of the engine 5 and rotated therewith, as does its sprocket 13. The countershaft 12ª is not driven until the pneumatic clutch is closed to couple the clutch spider with the clutch housing. In the same way, the housing of the clutch 34 carries the sprocket 33 and in this case the sprocket 33 being driven rotates the housing of the clutch 34. As this housing is journaled upon the shaft 12ª, the shaft 12ª is not driven until the clutch plates interposed between the housing of the clutch 34 and the clutch spider carried by the shaft 12ª are actuated to close the clutch.

It will be apparent from the foregoing that the engine 3 may be utilized for driving either of the pumps 1 and 2. To effect this drive with the engine 3 in motion, the shaft 36 drives clutch housing 39 to which is secured a sprocket 40, thus driving the sprocket 21. With the clutch 23 engaged the shaft 20 is driven, and by engaging the clutch 30, the V-belt drive to the pump 2 is rendered effective so that this pump is driven. With the clutch 23 engaged, clutch 24 may be engaged to drive the driven housing of the clutch 14, and upon engaging this clutch, the shaft 12ª is driven to drive the pump 1 through the V-belt transmission. In this operation clutch 34 is disengaged. In the same manner and through the same connections any one of the engines 3, 4 and 5 may be utilized for driving either of the pumps 1 and 2 or for the driving of any other element of the consolidated rig as fully described in the aforementioned co-pending application of Forrest J. Young.

Having fully described my invention, it is to be understood that I do not wish to be limited to the details herein set forth, but my invention is of the full scope of the appended claims.

I claim:

1. In combination with a pair of pumps, a pair of engines for driving the pumps, a first pump drive shaft, means for releasably coupling the first pump drive shaft with the first of said engines, a transmission means connecting the first pump drive shaft with the first pump for driving the same, a second pump drive shaft, clutch means for releasably connecting the second pump drive shaft with the second engine, a transmission connection between the second pump shaft and the second pump whereby the second pump is driven from the second engine, a transmission connection between the first engine and the second pump drive shaft, and a return transmission connection between the second pump drive shaft and first pump drive shaft whereby the first pump will be driven at a reduced speed from the first engine.

2. In a drilling rig, a pair of pumps, an engine for driving each of said pumps and transmission connections between the engines and the pumps including a first pump drive shaft mounted in axial relation with the drive shaft of the first engine, a clutch interposed between the first pump drive shaft and the drive shaft of the first engine, a second pump drive shaft mounted in alignment with the drive shaft of the second engine, means for releasably coupling the second drive shaft with the second pump for driving the second pump from the second engine, the clutch interposed between the first pump drive shaft and the drive shaft of the first engine including a clutch housing secured to the said first engine drive shaft, a sprocket carried by the housing, a sprocket journaled on the second pump shaft in alignment with the said housing sprocket, clutch means for releasably clutching the latter said sprocket to the second pump shaft, and a transmission connection between the second pump drive shaft and the first pump drive shaft, said transmission connections providing for a reduced speed of the first pump from the first engine.

3. In a pump drive mechanism the combination of two mud pumps, a pair of engines one for driving each of said pumps, transmission connections whereby either of said engines may be utilized for driving either of said pumps, and a transmission connection between one of the engines and one of the pumps whereby that engine may be utilized for driving the first pump at a reduced speed.

4. In a pump drive, the combination of a first pump and a second pump, a first engine and a second engine, a first countershaft and a second countershaft, the first countershaft being positioned in axial alignment with the drive shaft of the first engine, the second countershaft being positioned in alignment with the drive shaft of the second engine, clutch means for connecting the drive shaft of the first engine with the first countershaft, means for driving the first pump from the first countershaft, clutch means for releasably clutching the second countershaft with the drive shaft of the second engine, means for driving the second pump from the second countershaft, the clutch means between the first engine drive shaft and the first countershaft including a transmission element for coupling the first engine drive shaft with the second countershaft, a transmission element mounted on the second countershaft in alignment with the said clutch transmission element whereby the second countershaft is driven from the first engine, a transmission element mounted on the second countershaft for driving the first countershaft from the second countershaft, a transmission element mounted on the first countershaft in alignment with the latter said transmission element mounted on the second countershaft, transmission means connecting the latter said transmission elements, whereby the first pump may be driven from the first engine at a reduced speed.

5. In a two speed pump drive assembly including a pair of engines, a pump, a drive element for driving the pump, said drive element being rotatively mounted co-axially of the drive shaft of one of said engines, transmission means to operatively connect said engines for conjoint operation to drive the pump, selective means including said transmission means for driving said pump drive element at one speed, and means including a second transmission means for driving said pump drive element at a second speed.

6. In a two speed pump drive assembly including a pair of engines, a pump, a drive element for driving the pump, said drive element being rotatively mounted co-axially of the drive shaft of one of said engines, means including a friction clutch for effecting a driving relation between said engine and said drive element to drive the pump at one speed, and transmission means including a second friction clutch for effecting a driving relation between said engine and said drive element to drive the pump at a second speed, the second friction clutch being supported on a countershaft positioned coaxially of the second engine and arranged to be driven therefrom.

JOHN D. SPALDING.

REFERENCES CITED

The following references are of record in the file of this patent:

UNITED STATES PATENTS

| Number | Name | Date |
|---|---|---|
| 1,990,810 | Young | Feb. 12, 1935 |
| 2,071,778 | Walne | Feb. 23, 1937 |
| 2,282,597 | Archer | May 12, 1942 |